(12) United States Patent
Frederick

(10) Patent No.: US 9,441,939 B2
(45) Date of Patent: *Sep. 13, 2016

(54) SYSTEM FOR OBJECT DETECTION USING RADIO FREQUENCY REFLECTION

(71) Applicant: Clairvoyant Technology LLC, Chapel Hill, NC (US)

(72) Inventor: Thomas J. Frederick, Chapel Hill, NC (US)

(73) Assignee: Clairvoyant Technology LLC, Chapel Hill, NC (US)

( * ) Notice: Subject to any disclaimer, the term of this patent is extended or adjusted under 35 U.S.C. 154(b) by 110 days.

This patent is subject to a terminal disclaimer.

(21) Appl. No.: 14/022,296

(22) Filed: Sep. 10, 2013

(65) Prior Publication Data

US 2014/0015546 A1    Jan. 16, 2014

Related U.S. Application Data

(63) Continuation-in-part of application No. 13/813,464, filed as application No. PCT/US2011/048730 on Aug. 23, 2011, now Pat. No. 9,171,440.

(60) Provisional application No. 61/728,840, filed on Nov. 21, 2012, provisional application No. 61/376,781, filed on Aug. 25, 2010.

(51) Int. Cl.
    *G01B 7/14*      (2006.01)
    *G01S 13/38*      (2006.01)
    (Continued)

(52) U.S. Cl.
CPC .............. *G01B 7/14* (2013.01); *G01S 13/38* (2013.01); *G01S 13/84* (2013.01); *G01S 13/878* (2013.01); *G01S 2013/466* (2013.01)

(58) Field of Classification Search
CPC ......... G01B 7/14; G01S 13/38; G01S 13/84; G01S 13/878; G01S 2013/466

USPC ................................... 324/326–329
See application file for complete search history.

(56) References Cited

U.S. PATENT DOCUMENTS 3,769,575 A     10/1973    Rist
5,214,410 A     5/1993     Verster
(Continued)

FOREIGN PATENT DOCUMENTS

KR          100769880 B1     10/2007

OTHER PUBLICATIONS

Clairvoyant Technology LLC, International Application No. PCT/US2011/048730, International Search Report and Written Opinion, Dec. 6, 2011.
Clairvoyant Technology LLC, International Application No. PCT/US2011/048730, International Preliminary Report on Patentability, Aug. 20, 2012.
(Continued)

*Primary Examiner* — Jay Patidar
(74) *Attorney, Agent, or Firm* — Steven B. Phillips; Moore & Van Allen PLLC

(57) ABSTRACT

A radio frequency (RF) object detector is disclosed. The RF object detector in example embodiments transmits an RF signal. A receiver measures the amplitude, the phase, or both the amplitude and phase of the signal as reflected from objects in an interrogation zone. The RF object detector can be deployed in a combined system that performs multiple functions. For example, the RF object detector can be integrated with an EAS system that also sends RFID commands and receives RFID responses. In some embodiments the object detector can discriminate between moving objects and stationary objects, and/or discriminate between objects in the interrogation zone and objects outside the interrogation zone, and/or provide location estimates. An antenna or antennas can be connected in a mono-static or bi-static configuration and the phase and/or amplitude signals can be either DC-coupled or AC-coupled into the system through a mixer.

9 Claims, 13 Drawing Sheets

(51) Int. Cl.
   *G01S 13/84*   (2006.01)
   *G01S 13/87*   (2006.01)
   *G01S 13/46*   (2006.01)

(56) References Cited

U.S. PATENT DOCUMENTS

| | | | |
|---|---|---|---|
| 5,825,298 | A | 10/1998 | Walter |
| 6,356,230 | B1 * | 3/2002 | Greef ............... G01S 13/536 340/539.13 |
| 6,639,509 | B1 | 10/2003 | Martinez |
| 6,879,161 | B2 | 4/2005 | Rowan |
| 7,327,802 | B2 | 2/2008 | Sanders et al. |
| 7,521,890 | B2 | 4/2009 | Lee |
| 2006/0091888 | A1 | 5/2006 | Holman |
| 2006/0293018 | A1 | 12/2006 | Reynolds |
| 2007/0096881 | A1 | 5/2007 | Pillai |
| 2007/0206704 | A1 | 9/2007 | Zhou et al. |
| 2008/0055080 | A1 | 3/2008 | Britton |
| 2008/0063102 | A1 | 3/2008 | Okunev |
| 2009/0045917 | A1 | 2/2009 | Volpi et al. |
| 2010/0039264 | A1 | 2/2010 | Bergman |
| 2010/0060423 | A1 | 3/2010 | Pillai |
| 2010/0099355 | A1 | 4/2010 | Rofougaran et al. |
| 2010/0176947 | A1 | 7/2010 | Hall |

OTHER PUBLICATIONS

Clairvoyant Technology LLC, International Application No. PCT/US2012/038587, International Search Report and Written Opinion, Aug. 8, 2012.

Karode, S.L., et al., Feedforward Embedding Circulator Enhancement in Transmit/Receive Applications, IEEE Microwave and Guided Wave Letters, Jan. 1998, pp. 33-34, vol. 8, No. 1.

Xiong, Ting-Wen, et al., High TX-to-RX Isolation in UHF RFID Using Narrowband Leaking Carrier Canceller, IEEE Microwave and Wireless Components Letters, Feb. 2010, pp. 124-126, vol. 20, No. 2.

Kraus, John, D., Antennas, Second Edition, 1988, pp. 19-26.

Van Trees, Harry L., Detection Estimation, and Modulation Theory: Part I. Detection, Estimation, and Linear Modulation Theory, 2001, pp. 33-36, 246-251.

Yamazaki, Sadao, et al., Basic Analysis of a Metal Detector, IEEE Transactions on Instrumentation and Measurement, Aug. 2002, pp. 810-814, vol. 51, No. 4.

Chekcheyev, S., A Temperature-Stable Metal Detector, IEEE Transaction on Instrumentation and Measurement, Jun. 2009, pp. 1907-1910, vol. 58, No. 6.

\* cited by examiner

SYSTEM FOR OBJECT DETECTION USING RADIO FREQUENCY REFLECTION

CROSS-REFERENCE TO RELATED APPLICATIONS

This patent application claims priority from commonly-owned provisional patent application Ser. No. 61/728,840, filed Nov. 21, 2012, which is incorporated herein by reference. This patent application is also a continuation-in-part of and claims priority from commonly-owned U.S. patent application 2013/0169466, which is a national phase application of PCT patent application PCT/US2011/048730, filed Aug. 23, 2011 and claims priority from provisional patent application 61/376,781, filed Aug. 25, 2010, all of which are incorporated herein by reference.

BACKGROUND

Radio frequency identification (RFID) systems frequently use auxiliary systems to detect the presence or approach of objects through the desired read zone. The auxiliary systems might be light curtains, passive infrared devices, ultrasonic motion detectors, etc. Applications include detecting forklifts or hand trucks passing through RFID portals to load and unload cargo in a shipping and receiving environment, or detecting people or shopping carts moving through an entry/exit gate in an retail electronic article surveillance (EAS) system. These auxiliary object detection systems add to the cost of the RFID installation and decrease the reliability of the overall system.

SUMMARY

Embodiments of the present invention provide apparatus and methods for integrating object detection and estimation into a UHF or microwave frequency RFID system using the existing radio frequency (RF) transmission and reception as the physical means to detect and estimate objects, and possibly the object's motion, range, and position. The apparatus according to embodiments of the invention includes an RF object detector which may include motion, range, and position estimation. The RF object detector in example embodiments transmits an RF field into an interrogation zone using one or more antennas. The RF object detector has a receiver to measure the amplitude and/or phase of reflections of its transmitted signal from moving objects in the interrogation zone. Thus, object detection may be achieved by estimating the time varying reflection coefficient of the objects in motion. In some embodiments, the object detector enabled RFID system is integrated within a larger system, such as an EAS system or RFID portal, to reduce costs and add value.

An object detector according to some embodiments of the invention includes a transmitter to transmit an incident RF signal and a receiver to receive the reflected portion of the signal back from objects. The received signal can be referred to herein as a returned or a reflected RF signal. The reflection from the object or objects in the interrogation zone is due to impedance mismatches between free space and the objects. These reflections establish standing waves in the interrogation zone. A processor connected to the transmitter and the receiver with appropriate supporting circuitry is operable to detect objects by processing at least a portion of the reflected RF signal.

The object detector in example embodiment makes use of an antenna or a plurality of antennas. In some embodiments, the object detector operates by making phase and/or amplitude measurements of the reflected RF signal. In some embodiments, the processor is operable to discriminate between moving objects and stationary objects using the phase and/or amplitude measurements of the reflected RF signal received by the antenna or the plurality of antennas over time. In some embodiments, a plurality of antennas are arranged on different sides of the interrogation zone and the processor is operable to use the plurality of antennas to discriminate between objects in the interrogation zone and objects outside the interrogation zone.

In some embodiments, the object detector operates in a mono-static configuration, where the same antenna (or antennas) is (are) used for transmitting and receiving RF signals. A coupler or circulator connected to the transmitter and receiver enable an antenna to work both ways. In some embodiments, the object detector operates in a bi-static configuration, where separate antennas are used for transmitting and receiving. In some embodiments, the object detector operates as a DC-coupled system, where the reflected RF signals from a mixer are DC-coupled to an analog-to-digital converter through a lowpass filter. In other embodiments, the object detector operates as an AC-coupled system, where the reflected RF signals from the mixer are AC-coupled to the analog-to-digital converter through a bandpass filter.

The RF object detector can be integrated with another device for convenience and to reduce total cost. In some embodiments, the RF object detector is integrated with RFID interrogators or readers. In such an embodiment, the incident RF signal is modulated with one or more RFID commands. This modulation can be accomplished with a digital-to-analog converter. In such an embodiment, the processor is operable to both detect objects and determine RFID responses for tags in the interrogation zone by processing at least a portion of the returned RF signal. In some such embodiments, the processor detects objects by measuring the phase and/or amplitude of the returned RF signal during an RFID receive period, such as when the receiver baseband is DC coupled. In other embodiments which use AC coupled receiver baseband the processor detects objects by measuring the phase and/or amplitude of the returned RF signal during an RFID command transmit period or by using special measurement signals modulated onto the RF carrier. The RFID interrogators are often part of a larger integrated system such as an RFID portal or an electronic article surveillance (EAS) system.

The RF object detector operates in at least some embodiments by transmitting the incident RF signal and measuring a phase and/or amplitude in the returned RF signal. The phase and/or amplitude over time may be then compared to various "entry" and "exit" criteria. Entry and exit criteria are described in detail in US Patent Application Publication 2013/0169466, which is incorporated herein by reference.

In some embodiments, the object detector can determine phase of the reflected RF signal as a function of frequency to produce at least one of a range and a location estimate. The RF object detector operates in at least some embodiments by measuring a phase in the reflected RF signal from a plurality of RF carrier frequencies. The phase of the reflected signal is fitted to a straight line as a function of RF carrier frequency. The slope of this straight line fit produces an estimate of the range between the antenna and the object. This can be used and possibly combined with other information such as the reflected signal amplitude to provide location information of the object within the interrogation zone.

The RF object detector operates in at least some embodiments by measuring a phase in the reflected RF signal from a plurality of antennas and RF carrier frequencies. For each antenna the range is estimated as in the previous paragraph. Using the estimated antenna ranges and knowledge of antenna placement an object's position within the interrogation zone is estimated using trilateration algorithms.

The process of object detection or combined object detection and RFID communication can be implemented by means of processor together with appropriate transmitter and receiver hardware and an antenna or antennas. The processor can be exemplified by a digital signal processor or controller executing appropriate microcode, firmware or software stored in the object detector or RFID system. Alternatively, the processor can be hard-wired circuits or one or more custom integrated circuits, or a combination of any of these.

DETAILED DESCRIPTION OF EXAMPLE EMBODIMENTS

Figure 1:
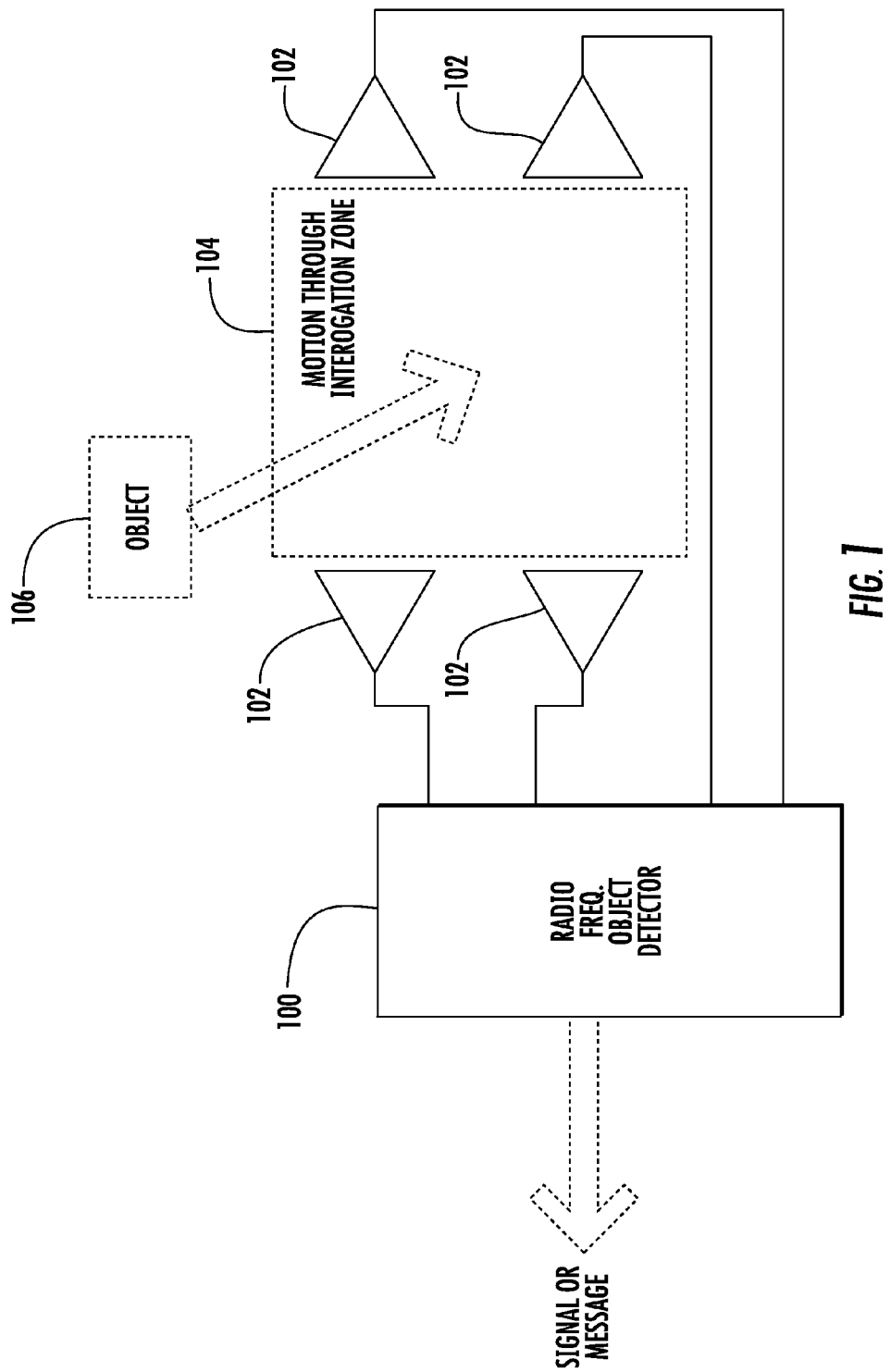
FIG. 1 is a functional block diagram of an example operating environment for an RF object detector according to embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Like numbers refer to like elements throughout.

Terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. It will also be understood that when an element is referred to as being "connected" or "coupled" to another element, it can be directly connected or coupled to the other element or intervening elements may be present.

As previously mentioned, embodiments of the present invention provide a system and method for using radio frequencies for object detection. The system can be embodied in an apparatus such as an RF object detector that transmits an RF field into an interrogation zone using one or more antennas. The RF object detector can use its receiver to measure the amplitude and/or phase of reflections of its transmitted signal from objects in the interrogation zone. It should be noted that by use of the term "radio frequency" or "RF" herein, reference is being made to systems and methods which use electromagnetic energy at frequencies where far-field effects dominate in typical detection environments, as opposed to inductive or other systems, which are near-field based. Such frequencies, for example, would typically be at least 300 MHz or at least 433 MHz.

Unlike radar systems, the RF object detector according to example embodiments does not employ time of flight or time difference of arrival techniques to measure range or calculate position. The RF object detector of example embodiments also does not require modulation or pulse compression techniques to create high time-bandwidth product signals. In at least some embodiments, the RF object detector uses continuous wave RF signals such that the required bandwidth is extremely narrow and easily satisfies most regulatory requirements. The term "continuous wave" as used in this disclosure with reference to RF signals refers to RF signals that enable object detection without time-of-flight, time difference of arrival, or modulation techniques common in longer range systems such as radar systems. The term does not necessarily imply that a signal is transmitted continuously over a specific period time, that the signal does not contain modulation used for other purposes in a system with multiple functions, or modulation used to enhance the object detection function when specifically stated. This RF object detector is well suited to be integrated with UHF or microwave RFID interrogators. For example, the passive RFID tags based around the ISO 18000-6 protocol, some of which are also known as "Gen2", are, as of this writing, beginning to be widely deployed in supply chain tracking and in EAS systems. Gen2 RFID is also widely used in supply chain distribution systems where RFID portals are used to read Gen2 tags attached to objects in the distribution chain. The Gen2 technology uses transmit frequencies above 800 MHz, specifically, from 860 MHz to 960 MHz. The type of radio system needed in a Gen2 interrogator is also very well suited to the proposed RF object detector so that both functions can be integrated into the same device. This design, wherein a method for RF object detection is included with the reading of Gen2 tags, can offer an efficient system since such a system detects both RFID tags and other objects such as forklifts, people, and shopping carts.

A block diagram of the operating environment of an example RF object detector 100 is shown in FIG. 1. The object detector is attached to one or more antennas 102 used to cover an interrogation zone 104 where an object 106 is to be detected moving through the interrogation zone. In some embodiments, the antennas may be functionally treated as part of the object detector. In other embodiments, the object detector and the antennas may be referred to as a "system." The object detector 100 contains a transmitter and a receiver. In some embodiments transmit RF power is routed to a transmit antenna or transmit antennas and reflected RF power is received through from a separate receive antenna or separate receive antennas. Such an object detection system may be referred to as being in a bi-static configuration. If the same antenna or plurality of antennas is used for both transmitting and receiving, the system may be referred to as being in a mono-static configuration. The object detector can be used to detect objects in motion in the interrogation zone by detecting the phase and/or amplitude changes of the reflected or returned RF signal as described in detail in the following paragraphs. When an object is detected moving through the interrogation zone, then a signal or message is sent to activate an audio and/or visual indicator as indicated in FIG. 1. Alternatively or in addition, a message may be sent to a host controller. The message from the RF object detector may include a parameterized description of the object detector estimates such as amplitude, speed, direction, location, etc.

Figure 2:
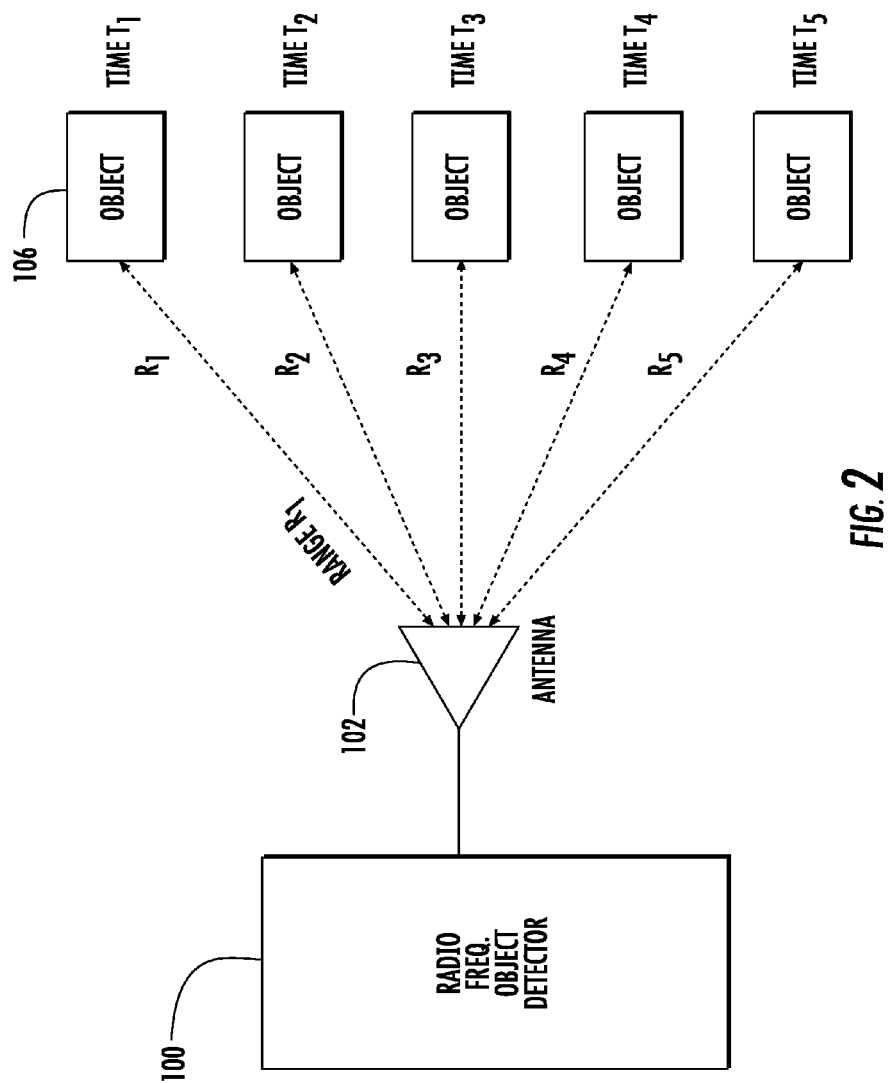
FIG. 2 is a high-level block diagram illustrating the operation of an RF object detector according to example embodiments of the invention.

FIG. 2 illustrates more details regarding the operation of the RF object detector according to embodiments of the invention. For clarity, it will be assumed that a single antenna 102 is used for both transmit and receive functions (mono-static configuration). The transmit RF wave will propagate through free space a distance R defined as the range to object 106. If the object has dimensions relative to the wavelength of the RF wave such that the object is in the optical or resonant region, then a significant portion of the RF wave hitting the object will be reflected back toward antenna 102. In some embodiments, the object detector may work better if the antenna is linearly polarized since for circular polarization, the reflected RF wave may have reversed polarization. The reversed polarization of the reflected RF wave may make it poorly received on a circularly polarized antenna, since the returned wave will have the opposite polarization as the antenna. The reflected RF signal will be sensed by the antenna and be received by the object detector; that is passed into the receiver circuitry of the object detector for processing. The round-trip propagation length of the received RF wave is 2·R, which imparts a $$\theta = 360 \cdot (2 \cdot R)/\lambda = \frac{720 \cdot R}{(c/F_C)} = \frac{720}{c} \cdot R \cdot F_C \approx (2.4e-6) \cdot R \cdot F_C$$

degree phase shift on the reflected RF signal relative to the transmitted RF signal. The equation above shows a linear relationship between $\theta$ and R when the carrier frequency $F_C$ is fixed. Likewise, there is a linear relationship between $\theta$ and the carrier frequency $F_C$ when the range R is fixed. This property can be used to estimate range and motion of objects in the interrogation zone.

If the object 106 is in motion as shown diagrammatically in FIG. 2, this phase shift will vary as a function of time, $\theta(t)$, since the range R(t) is a function of time. FIG. 2 shows the object at five different instants in time. At times $t=T_1$ and $t=T_2$ the object is coming into the interrogation zone and the ranges $R_1$ and $R_2$ are getting shorter. Therefore the total phase shift of the RF wave is decreasing, until at time $t=T_3$ the range $R_3$ is at its shortest length when the object 106 moves tangential to the antenna. After this point in time the range begins to increase and so the phase shift begins to increase.

For an object approaching and then moving past an antenna in a straight line as shown in FIG. 2, if the object has constant speed S, then using basic trigonometry the range R as a function of time can be expressed:

$$R(t)=\sqrt{R_3^2+(S \cdot (t-T_3))^2}$$

where $R_3$ is the minimum range to the antenna, which occurs at time $T_3$. It follows that the phase angle, expressed in degrees, would be:

$$\theta(t)=360 \cdot 2 \cdot \sqrt{R_3^2+(S \cdot (t-T_3))^2}/\lambda.$$

Figure 3:
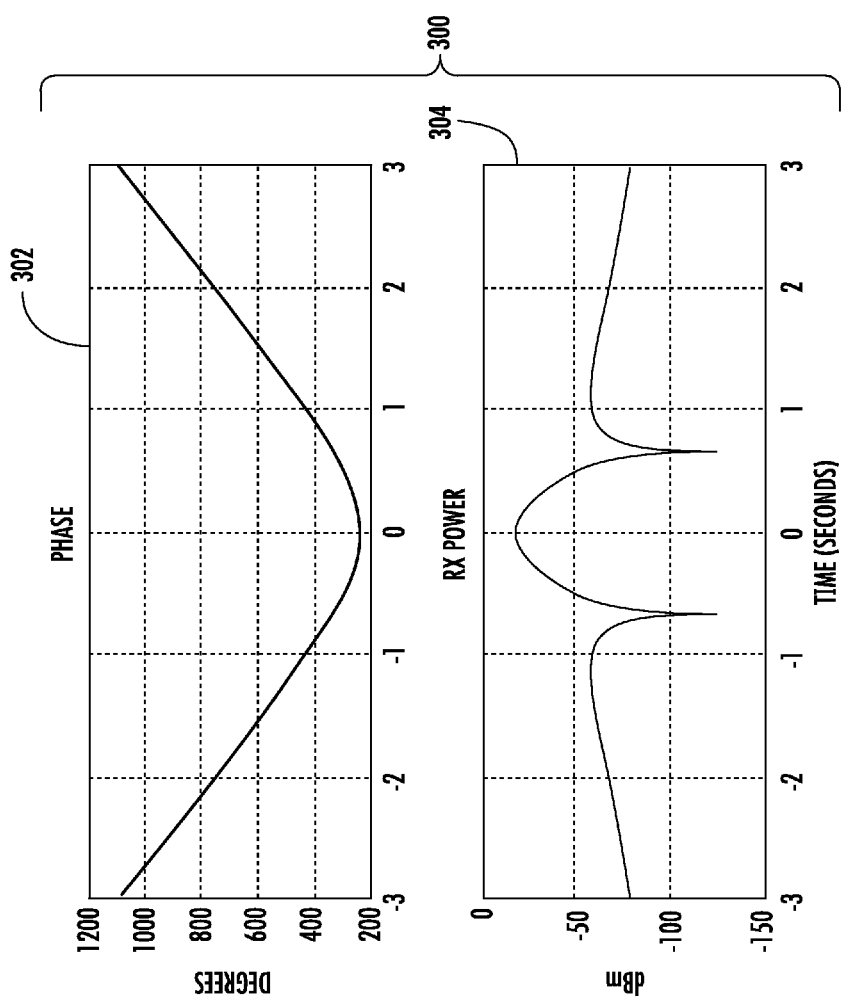
FIG. 3 shows example graphs of phase and amplitude over time for an RF return signal being processed by an RF object detector according to example embodiments of the invention.

This phase is plotted in the top half 302 of FIG. 3 with minimum range $R_3=1$ meter, speed S=1.5 meters/second, wavelength $\lambda=1/3$ meter (corresponding to approximately 915 MHz carrier frequency), and time of minimum distance taken as $T_3=0$, without loss of generality.

The amplitude of the reflected signal is also a function of position of the object. Many variables affect the reflected amplitude received at the antenna, including the transmitted power, the angular gain pattern of the antenna, the path loss of the propagated RF wave, and the scatter aperture of the object. The bottom half 304 of FIG. 3 illustrates the receive power, in dBm, for the same object moving at 1.5 meters/second past the antenna. The transmit power used for this plot is 30 dBm and the antenna gain is 9 dB. The "nulls" in receive power occurring at +/−0.67 seconds in this example are due to the angle of the object relative to the antenna pattern, specifically the object moves between side lobes and the main antenna lobe at those instants. Again, the plots have taken $T_3=0$ as the instant which the object moves closest to the antenna. For time less than 0 the object is getting closer to the antenna, and for time greater than zero the object is moving farther from the antenna. At time $T_3=0$ the object moves tangential to the antenna, at which point the receive signal amplitude is highest, the range is shortest, and the phase goes from decreasing to increasing. This characteristic of the amplitude and/or phase curves can be used to detect objects moving through the interrogation zone. Multipath fading effects may add noise and distortion to the amplitude and/or phase curves, but there is typically adequate signal-to-noise ratio to achieve good detection results. As will be seen in the following paragraphs, in at least some embodiments it is advantageous to know the maximum rate of change of the phase of the reflected signal due to an object in motion. This quantity will be denoted $\delta\theta_{max}$ and is obtained by considering an object moving directly toward the antenna at maximum speed:

$$\delta\theta_{max} = \frac{720}{c} \cdot F_{max} \cdot S_{max}$$

where $S_{max}$ is the maximum speed and $F_{max}$ is the maximum RF carrier frequency to be used. The maximum speed is application dependent. Consider an EAS application using the 915 MHz instrument, scientific, and medical (ISM) band in the United States. If the maximum speed is assumed to be 5 meters/second and the maximum carrier frequency in this ISM band is $F_{max}$=928 MHz, then $\delta\theta_{max}$ is approximately 11,144 degrees/second.

Figure 4:
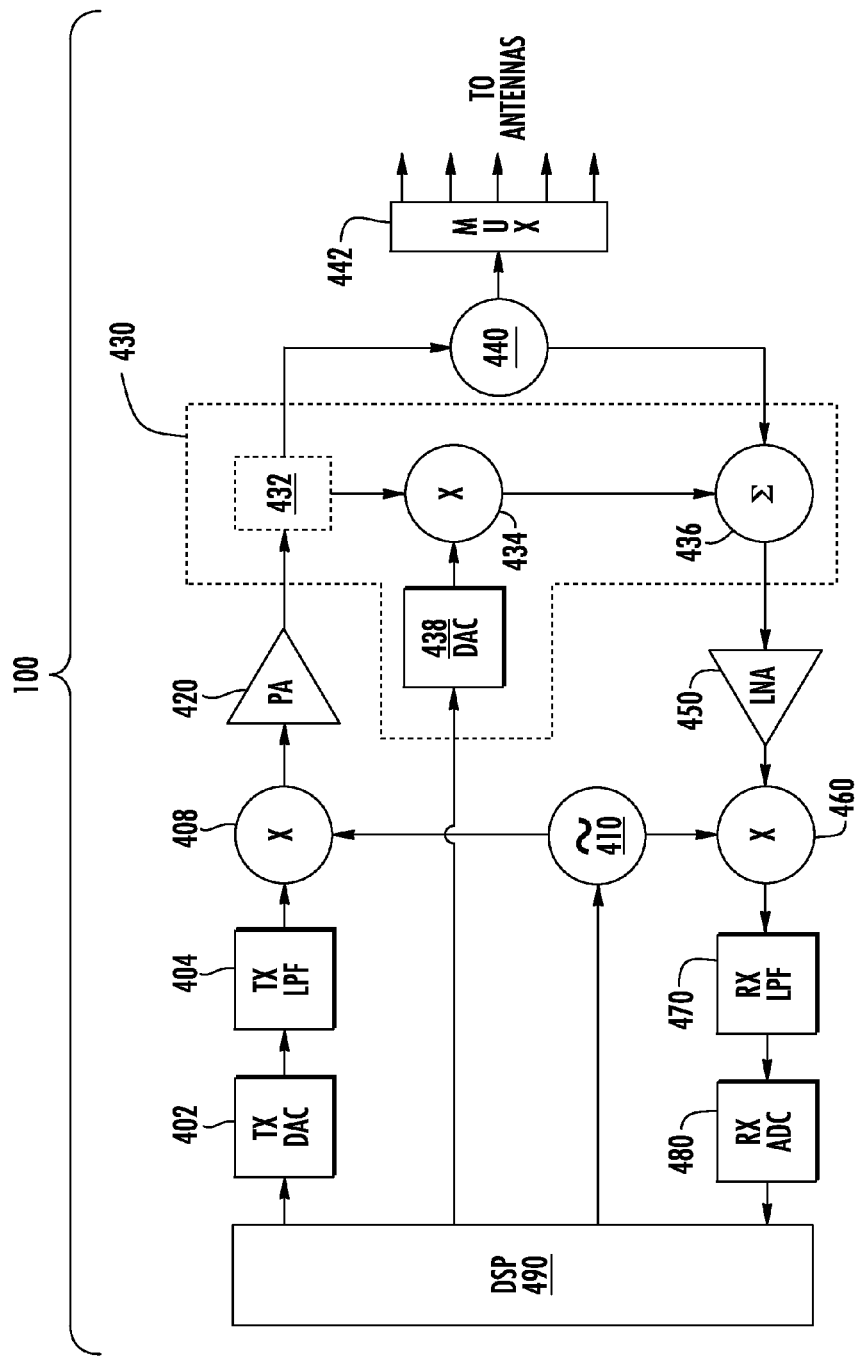
FIG. 4 is a detailed functional block diagram of an RF object detector according to some example embodiments of the invention. In this example, the RF object detector is a "DC-coupled" system.

FIG. 4 is a more detailed block diagram view of the RF object detector 100 from FIG. 1. The components of the object detector in this example include RF oscillator 410, typically operating in the VHF, UHF, SHF, or EHF bands, a transmit digital-to-analog converter (TX DAC) 402 to create baseband transmit modulation signals, transmit low pass filter (TX LPF) 404 to remove image frequencies from the TX DAC output, a TX MIXER 408 to frequency translate the baseband transmit signal up to the RF carrier frequency, an RF power amplifier (PA) 420 to create the high power transmit signal to deliver to the transmit antenna, an active transmit-to-receiver isolation circuit 430 to improve object detection sensitivity. Isolation circuit 430 can be used in either mono-static or bi-static configurations. The isolation circuit 430 includes coupler 432 to sample a portion of the transmit signal, vector modulator 434 or other means to adjust the amplitude and/or phase of the sampled transmit signal, a digital-to-analog converter, or DAC 438 to control the vector modulator 434, and combiner circuit 436 to subtract the adjusted transmit replica. The isolation circuit 430 is discussed in great detail in US Patent Application Publication 2013/0169466, previously referenced, and will not be discussed further herein. There are many variations of the active isolation circuit used in the industry and the exact design is not relevant to this description. Some isolation circuit is needed in some embodiments though to remove the static RF reflections from the antenna mismatch and from clutter in and near the interrogation zone. For purposes of this disclosure, component 440 will be referred to as a coupler. However, although coupler 440 can be a coupler in the traditional sense, coupler 440 can also be a circulator or any other component used in mono-static configurations to connect the shared transmit/receive antenna(s) to the transmitter circuitry and receive circuitry. In bi-static configurations (not shown) separate transmit and receive antennas are used so that no coupler is required.

Still referring to FIG. 4, a multiplexing circuit (MUX) 442 is included in the object detector to switch the transmitter and receiver circuitry between antennas if multiple antennas are needed to cover the interrogation zone. RF low noise amplifier (LNA) 450 is used to amplify the receive signal. A quadrature receive mixer 460 uses the RF oscillator 410 to translate the receive signal from RF to baseband in-phase (I) and quadrature-phase (Q) signals. Low pass filter (LPF) 470 removes unwanted out-of-band signals from the baseband receive signal and an analog-to-digital converter (ADC) 480 samples the baseband I and Q signals. Digital signal processor (DSP) 490 together with software or firmware algorithms running on the DSP generates the transmit baseband modulation waveforms and filters the sampled receive baseband I and Q signals to detect the reflected signal from objects in motion through the interrogation zone. A variety of types of processors can be used to provide these functions. A processor to operate the system can consist of or include a DSP, embedded controller, microprocessor, programmable logic array, or even dedicated, customized hardwired circuitry.

Other optional components not shown in FIG. 4 may include RF bandpass filters, isolators, baseband anti-aliasing or anti-imaging filters, etc. FIG. 4 represents only one example embodiment of the device; other hardware implementations are possible. For example, the LNA 450 could be omitted for a lower cost version of the device. FIG. 4 represents a direct conversion radio wherein baseband signals are translated directly to/from RF in a single mixing stage. Other radio configurations are possible within the scope of this disclosure. For example, a super-heterodyne radio wherein an intermediate frequency is generated either with a second mixer or directly within the DSP could be implemented in an embodiment of the invention. These and any other alternative embodiments of the device should be considered to fall within the scope of this invention disclosure.

The detailed operation of the example object detector of FIG. 4 is as follows. The RF oscillator 410 creates a sinusoidal signal at the desired operating frequency. The RF oscillator may be programmable such that it can generate various frequencies over its rated operating range, such as 860 MHz to 960 MHz for a UHF oscillator capable of covering the various ISM bands, which are used for passive UHF RFID. For a programmable oscillator, the DSP 490 could program the oscillator 410 as needed to meet the regulatory requirements of the ISM band in which it is operating. For example, both the U.S. FCC Part-15 band and the ETSI EN302208 band use multiple frequency channels, which the radio must hop between in order to operate continuously. If the device employs frequency hopping, the frequency hopping must be accounted for in the phase processing method. The RF oscillator output is routed to the mixer 408 wherein it mixes with the transmit baseband waveforms to translate them to the RF carrier frequency. The transmit baseband waveforms will generally include RFID commands to the tags in the interrogation zone, as well as DC signals used to create continuous wave RF signals onto which the tags may modulate their data. The oscillator 410 output is also coupled to the quadrature receive mixer 460. In this way the transmitter and receiver use a common reference signal so that only the phase shift due to the RF propagation is measured. Note that the transmitter and receiver circuitry will typically impart some frequency dependent phase shift, which is not due to antenna-to-object propagation. This circuit phase shift can be calibrated out.

Still referring to FIG. 4, the mixer 408 output is passed to the PA 420 and the output from the PA 420 is connected to the coupler 432. The coupler is part of the active transmitter-to-receiver isolation circuit 430. The coupler 432 samples a small portion of the transmit signal and directs it to the vector modulator 434, but most of the transmit power passes through the coupler 432 to coupler 440. Coupler 440 is only required in mono-static antenna configurations, which is when the same antenna element is used for both transmit and receive functions. In bi-static antenna configurations (not shown), the coupler 432 would be connected to a transmit antenna multiplexer, and a separate receive antenna multiplexer would be connected to the summing combiner 436. However, the bi-static configuration may be less desirable due to the increased cost and complexity of twice the number of antennas and cables to cover the same interrogation zone. Nonetheless, this embodiment of the invention can be applied equally well to the bi-static antenna configuration. For the mono-static mode shown in FIG. 4, the coupler 440 is used to isolate the transmit RF power from the receive RF power. The transmit RF power is conducted from the PA 420 through the coupler 432, through the coupler 440 out to the antenna multiplexor 442 and on to the currently selected antenna. The receive RF power is conducted from the currently selected antenna back through the multiplexor 442 through the coupler 440 and into the receive path starting at the combiner 436.

The output of the combiner 436 in FIG. 4 is passed to the LNA 450 to provide some gain prior to the down-converting receive mixer 460. In a pure object detection application where the receiver requires limited sensitivity of −50 dBm to −60 dBm, then LNA 450 may not be required. However, if the object detection function is integrated into an RFID interrogator or other radio transceiver such as an 802.11 or 802.15 modem, then LNA 450 may be required to achieve the required noise figure. The receive mixer 460 converts the incoming RF signal to baseband and passes the unfiltered I and Q signals to the LPF 470. The LPF 470 removes interfering signals from other radio transmitters on nearby RF channels. The design of LPF 470 depends on carrier frequency chosen, the maximum speed of the objects, as well as any additional functionality performed by the radio device. For object detection functionality the LPF must pass the maximum frequency shift due to moving objects in the interrogation zone, which is:

$$F_{max} = \delta\theta_{max}/360.$$

As an example of the above, consider a device operating in the 915 MHz ISM band of the United States where the maximum expected speed $S_{max}$=5 meters/second. $\delta\theta_{max}$ is calculated as approximately 11,144 degrees/second, which leads to $F_{max}$=30.95 Hertz. If this same device where operating in a 2.45 GHz ISM band then $F_{max}$=81.72 Hertz. If the object detector is integrated with some other radio function, such as an RFID reader, RFID portal, or EAS system, then the requirements of the LPF 470 as shown in FIG. 4 will largely be driven by the other radio functions. For example, in an RFID reader implementing the Gen2 protocol the LPF may need to have a corner frequency of somewhere between 350 KHz and 1 MHz, depending on the return link frequencies being used. The output of the LPF 470 is passed to the ADC 480 which samples the analog filtered I and Q signals. The sampling rate of the ADC 480, denoted $F_S$, is best set 8 to 10 times higher than the maximum frequency into the ADC, so that the aliasing effect is avoided and accurate signal measurements can be taken. Typically there is a tradeoff where increasing the sampling frequency results in reduced complexity for the LPF 470. For an object detection system integrated with a Gen2 RFID interrogator, the ADC sampling frequency $F_S$=10 MHz would work well.

The DSP 490 of FIG. 4 may use filtering techniques to average the ADC samples so that an accurate estimate of the reflected carrier I and Q signals is obtained. The time span of the digital filtering, or the "observation window" used to generate digitally filtered I and Q output samples, is K samples, where $T_{observation}$=K/$F_S$ is the observation window for the current phase and/or amplitude measurement. The duration of the observation window should be much smaller than the time required for the object to move half of a wavelength. It is best to keep the observation time to less than a few degrees so that the I and Q signals are not changing significantly during the averaging. For example, if the operating frequency is in the 915 MHz U.S. FCC ISM band and the objects can move as fast as 5 meters per second then one half wavelength can be travelled in 32.8 milliseconds, which corresponds to the time for the reflected signal phase to rotate 360 degrees. Therefore, the minimum time for 2 degrees of phase rotation is about 182 microseconds. If, in FIG. 4, ADC 480 is sampling at 10 MHz, then this corresponds to 1820 samples to average with a digital filter to produce the I and Q measurements. DSP 490 may use a K tap finite impulse response (FIR) filter, such as a minimum 4-term Blackman-Harris function, to calculate the estimated I and Q values.

The curves in FIG. 3 were calculated using an idealized model where the moving object's parameters of distance, speed, scatter aperture, and orientation relative to the antenna were used in formulas to create the curves. The phase and receive power curves in practice will vary with these parameters, and in practice these parameters are not known and are not fully observable. Only the baseband I/Q signals are measureable. The receive signal power is calculated as $$P_{RX} = I^2 + Q^2$$

and the receive signal amplitude is calculated as:

$$A_{RX} = \sqrt{P_{RX}} = \sqrt{I^2 + Q^2},$$

Note that either the amplitude $A_{RX}$ or the power $P_{RX}$ can be used for the processing. The amplitude estimate has the advantage of reducing the dynamic range demands on the processor. However, the amplitude estimate has the disadvantage of requiring a square root operation. The choice of using amplitude or power will affect the various applicable thresholds in the following discussion, but beyond that and the dynamic range and square root functions the amplitude and power are equivalent, since there is a one-to-one monotonically increasing functional relationship between the two. Indeed, any amplitude or power approximation function could be used, which is a monotonically increasing function of the reflected RF power. The use of such an arbitrary approximation function does not depart from the spirit and scope of the invention claimed herein.

The phase is calculated as the four-quadrant arctangent using the baseband I and Q signals:

$$\theta_{RX} = \operatorname{atan} 2(Q, I).$$

This phase function wraps modulo 360 degrees. Note that the signals and variables above are time dependent, but this explicit time dependency is omitted for simplicity. Also note that other approximation function could be used, where the function is a monotonically increasing function of the reflected RF phase for angles $0 <= \theta_{RX} < 360$. The use of such an arbitrary approximation function does not depart from the spirit and scope of the invention claimed herein.

Figure 5:
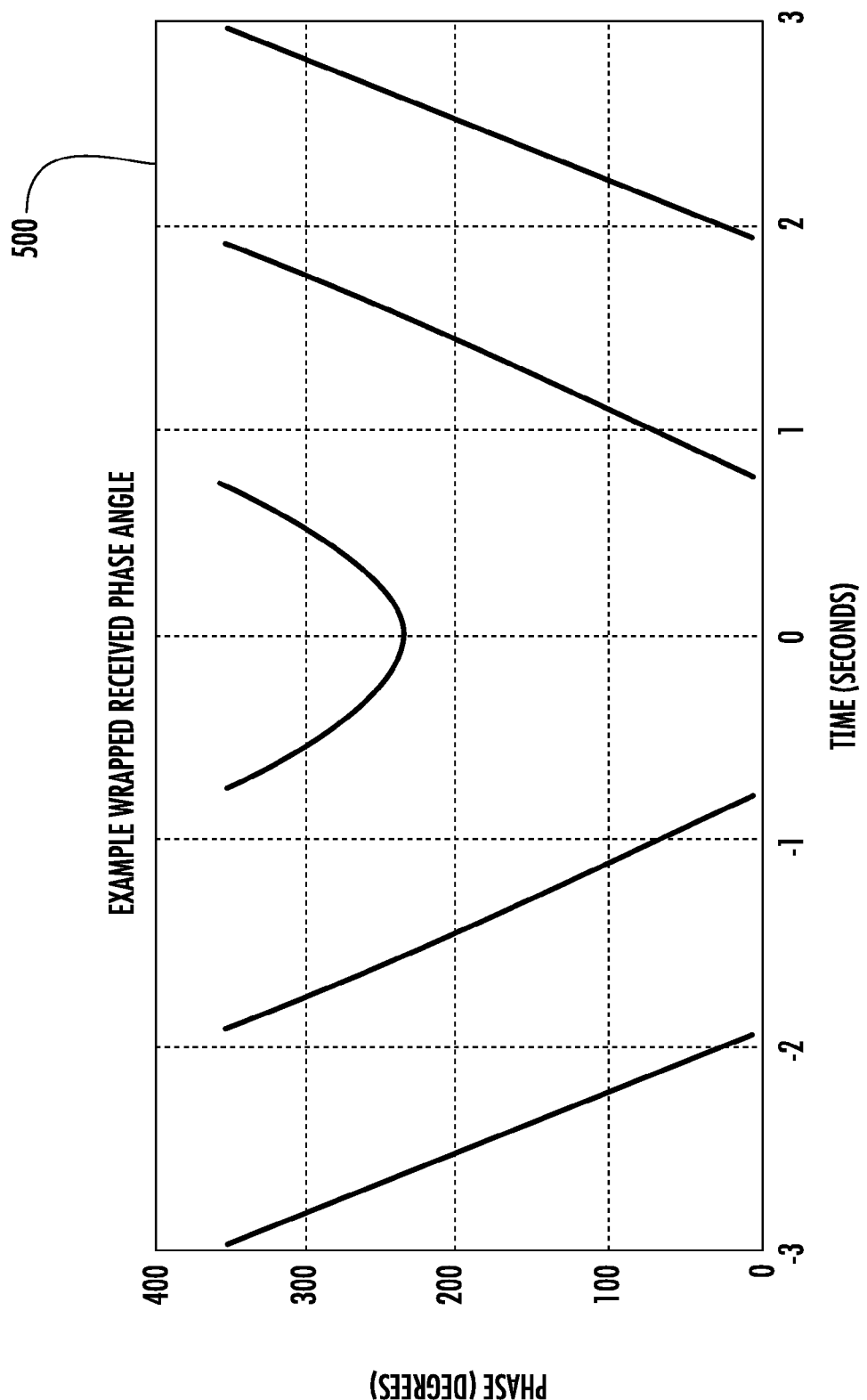
FIG. 5 shows example graphs of wrapped phase as measured by the RF object detector using an arctangent type of function.

The implementation of the arctangent formula above would yield an output phase as shown in graph 500 of FIG. 5. This wrapped phase is what is observable given the baseband I and Q signals. The phase curve as shown in FIG. 3 is an "unwrapped" version of the phase, which must be computed inside the DSP using an unwrapping algorithm. To interpret the computed phase meaningfully, any jump in phase larger than 180 degrees is unwrapped so that the phase appears as a continuous curve, as in FIG. 3.

To illustrate phase unwrapping of the sequence of phase measurements is denoted as $\theta_{RX}(n)$, and the unwrapped phase measurement is denoted as $\phi_{RX}(n)$, then the unwrapped measurement can be obtained with the following steps:

1. Compute $\omega_{RX}(n) = \theta_{RX}(n) - \theta_{RX}(n-1)$
2. If $\omega_{RX}(n) > 180$, then $\omega_{RX}(n) = \omega_{RX}(n) - 360$
3. If $\omega_{RX}(n) < -180$, then $\omega_{RX}(n) = \omega_{RX}(n) + 360$
4. $\phi_{RX}(n) = \phi_{RX}(n-1) + \omega_{RX}(n)$ This process produces a continuous phase trajectory as is shown in the top of FIG. 3, to within an arbitrary constant. The arbitrary constant is unknown and does not matter for the purposes of measuring relative object motion.

The system must only unwrap phase measurements taken using the same frequency. Some regulatory schemes such as FCC Part-15 in the United States require the radio hop between different carrier frequencies, such as 50 frequencies in the FCC case. Because the carrier frequency and therefore wavelength are different, the phase of the received reflected signal will be different for different frequencies. Thus, when a frequency hop occurs, the object detection algorithm must account for an abrupt phase shift in the reflected signal. This sudden phase shift does not reflect actual movement in the object, just a difference in wavelength. Since the DSP typically controls the frequency of the oscillator, handling these frequency hops is not problematic.

In some embodiments of the invention this carrier frequency dependence of the phase is exploited to estimate the range R of the object from the antenna 102. Recall the linear expression for reflected carrier phase $$\theta = \frac{720}{c} \cdot R \cdot F_C \approx (2.4e-6) \cdot R \cdot F_C.$$

Figure 6:
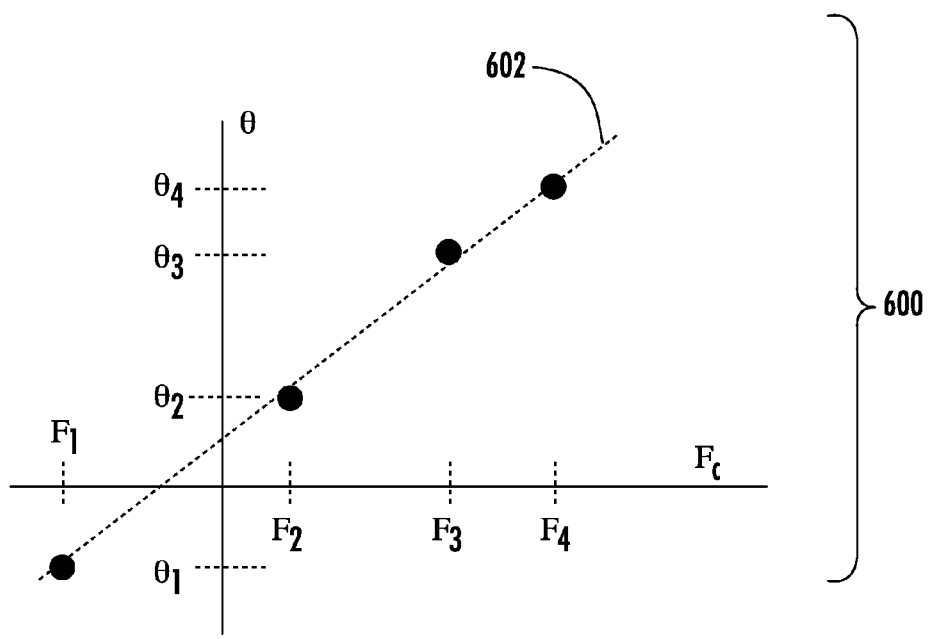
FIG. 6 is an example set of data showing measured phase as a function of transmit carrier frequency for an object at a fixed range from the antenna.

This indicates that the phase changes in a linear relation with the carrier frequency so that if the phase were measured at two or more carrier frequencies then the slope of the resulting straight line fit to the data provides an estimate of the range R. This is illustrated in graph 600 of FIG. 6. In this figure, the phase is measured at four separate frequencies and a straight line fit is generated for the resulting data points. The measured points may not exactly fit a line due to measurement noise. This straight line fit could be generated using linear regression or any number of other ways available in numerical analysis. The slope "m" of the resulting line 602 is an estimate of $(2.4e-6) \cdot R,$ according to the equation above. Thus, $R = m/(2.4e-6)$ is an estimate of the range of the object from the antenna.

Figure 7:
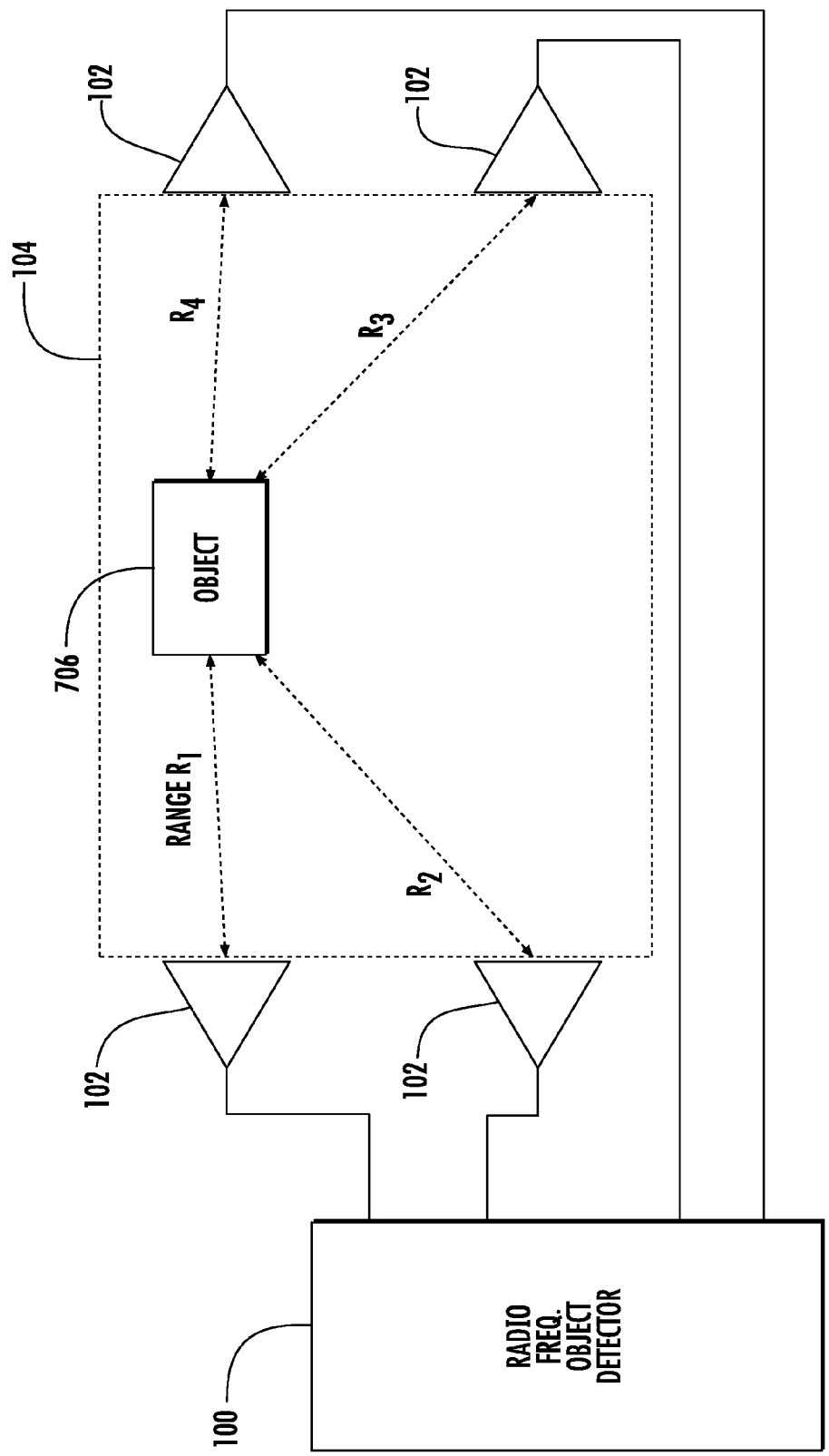
FIG. 7 shows a diagram of an object in the interrogation zone wherein the RF object detector estimates ranges from multiple antennas covering the interrogation zone using multiple transmit frequencies.

In some embodiments of the invention this range estimate can be combined from multiple antennas using a trilateration algorithm to estimate the position of an object within the interrogation zone, as shown in FIG. 7. The system of FIG. 7 is like the system of FIG. 1 except that object 706 is in the interrogation zone. There are a number of publicly available trilateration algorithms which can be applied. Embodiments of this invention provide a way to estimate the ranges for the antennas. To use the trilateration based position estimation, the antenna positions must be known and specified in whatever coordinate system is used to estimate the object position.

As previously mentioned, the RF object detector according to example embodiments of the invention can be integrated into other devices. US Patent Application Publication 2013/0169466, incorporated herein by reference, gives an example of an RF metal detector integrated into an RFID interrogator. Specifically, FIGS. 9, 10, and 11 of the publication give detailed instruction of how to integrate an RF metal detector and more generally an embodiment of the RF object detector into an RFID reader.

Figure 8:
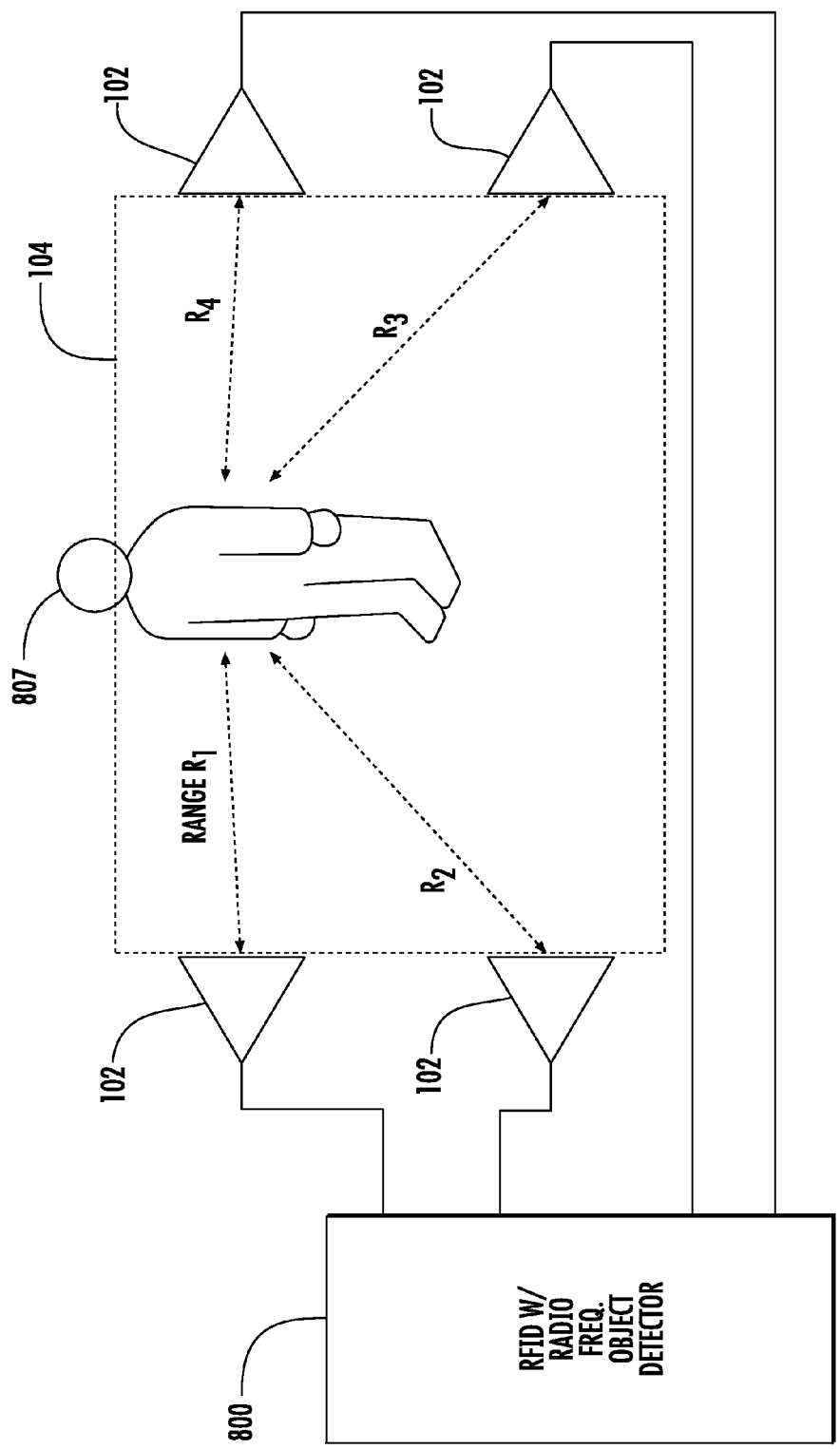
FIG. 8 shows an embodiment of the invention used in an EAS system to detect people moving through the interrogation zone.

FIG. 8 shows an example embodiment of the RF object detector in an RFID reader 800 implementing people detection in an RFID based EAS system. The example embodiment of FIG. 8 is more generally applicable in any application where people go through an RFID "choke point" to track RFID tagged items. Examples of this include office environments where files are tagged with RFID tags in order to keep track of the file locations or in factory environments where tools and equipment may be tagged with RFID tags in order to keep track of the asset locations. RFID enabled identification badges on employees, students, or inmates could be used to keep track of location for security and safety in office, warehouse, school, or prison environments. If a person is detected with no RFID tag and alarm or warning message can be issued. In FIG. 8, a person 807 is moving through the interrogation zone.

Figure 9:
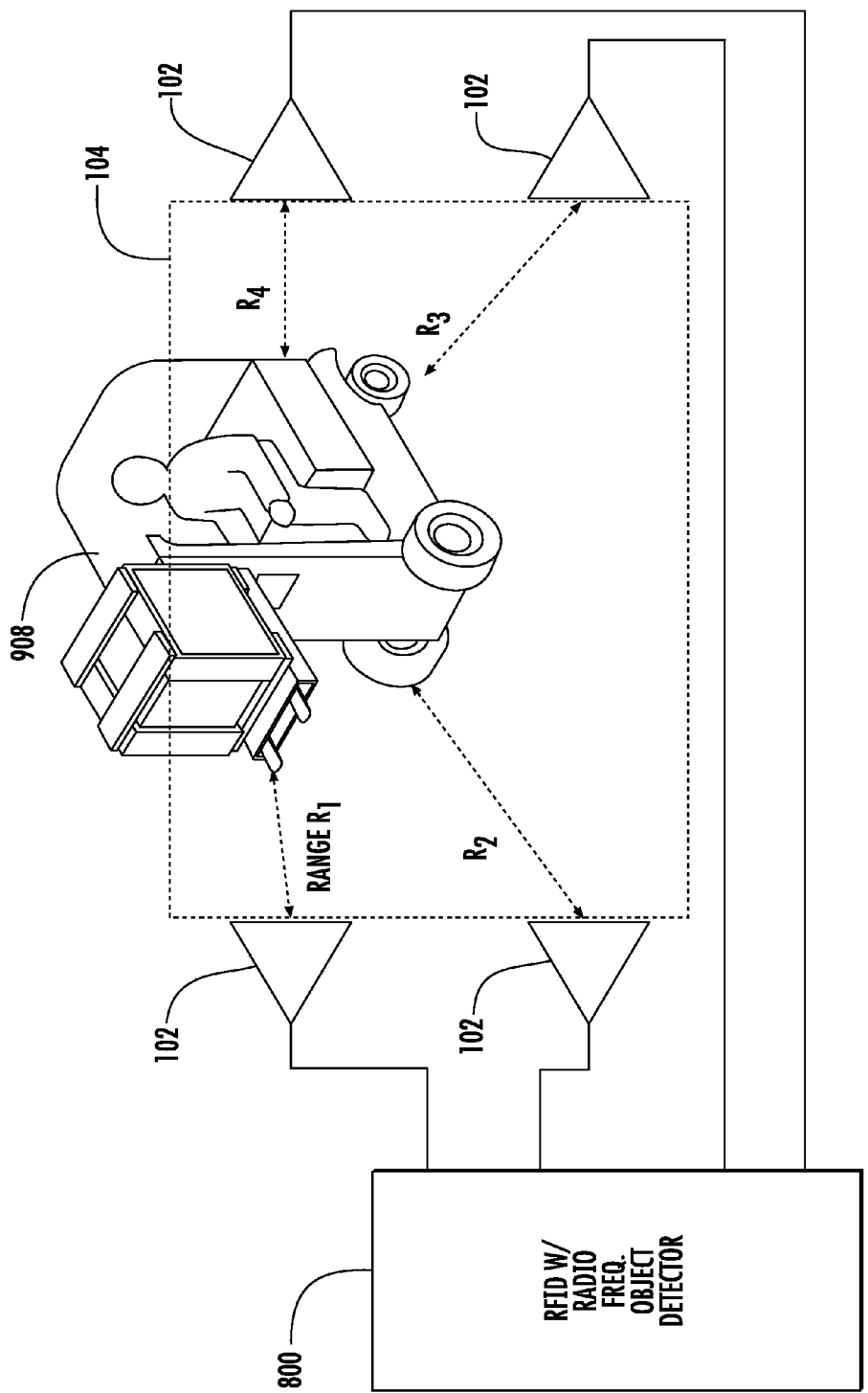
FIG. 9 shows an embodiment of the invention used in an RFID portal system to detect forklifts moving through the interrogation zone.

FIG. 9 shows an example embodiment of the RF object detector in an RFID reader implementing forklift truck detection in an RFID based supply chain portal. Such RFID portals are used for loading and unloading delivery trucks wherein the items on the pallets are tagged with RFID. It is useful to detect when the forklift comes into the interrogation zone to help discriminate between tags that are currently on the forklift's pallet as opposed to tags that are simply near the dock door portal. The system of FIG. 9 is like that of FIG. 8 except that forklift truck 908 is moving through the interrogation zone.

Figure 10:
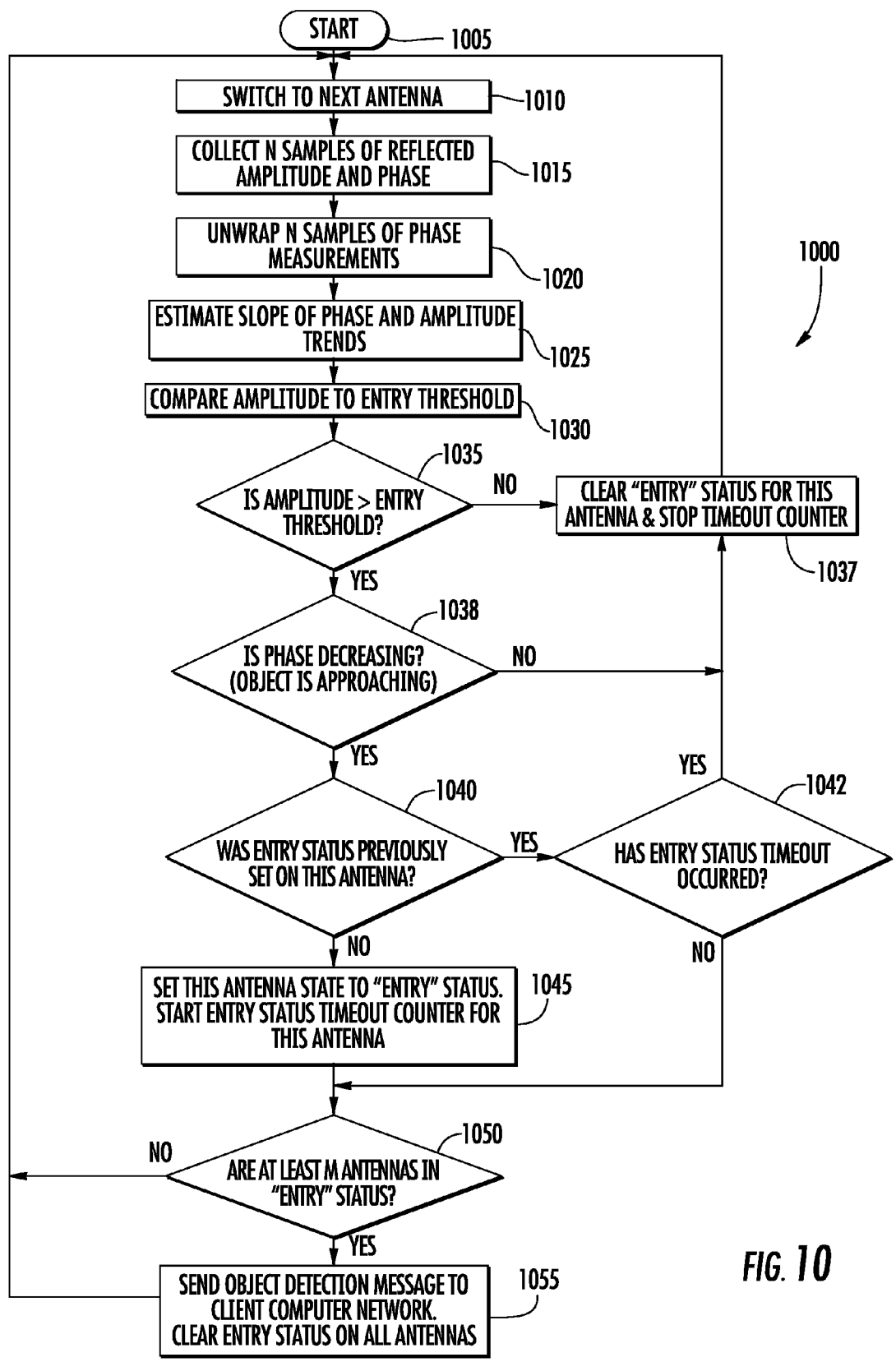
FIG. 10 shows a flowchart illustrating a process for detecting the entry of an object into the interrogation zone using only amplitude and/or phase of the reflected signals according to example embodiments of the invention.

In the RF metal detector of previously referenced US Patent Application Publication 2013/0169466, an embodiment of the invention is disclosed to detect objects, which move through the interrogation zone. This algorithm is based on entry and exit conditions derived from the reflected carrier amplitude and/or phase estimates from one or more antennas, and this embodiment is included here by reference. Some applications will perform best if the object detection is signaled before the object is exiting the interrogation zone. FIG. 10 provides an algorithm to detect the entrance of an object into the interrogation zone based on the reflected carrier amplitude and/or phase estimates from one or more antennas. FIG. 10 illustrates the process in flowchart form. As with many flowcharts and as with the other flowcharts presented herein, process 1000 is illustrated as a series of subprocess blocks. Note that it is possible to implement algorithms by using only the reflected RF amplitude or the reflected RF phase. Such implementations do not depart from the spirit and scope of the invention claimed herein. However, algorithms illustrated in US Patent Application Publication 2013/0169466 and herein employ both amplitude and phase for superior performance.

At block 1005 of FIG. 10 the algorithm starts its object detect process and enters the loop. At block 1010 the algorithm switches to the next antenna in the sequence, if there are more than one antennas being used. At block 1015 the algorithm collects multiple (N) samples of the amplitude and/or phase from the reflected signal. This may be done using receive slots in an RFID reader for DC coupled receivers or it may be done using command slots in an RFID reader for AC or DC coupled receivers, or it could be done using special transmit signals designed specifically for this purpose. At block 1020 the algorithm unwraps the phase of the sequence of N phase samples. At block 1025 the algorithm estimates the slope of the reflected amplitude and/or phase signals. At block 1030 the algorithm compares the amplitude signal to a threshold for object entry detection. In most applications this threshold will be a programmable value, which is determined by multiple factors, including transmit power and sensitivity to false alarms and missing objects. The previously referenced US Patent Application Publication 2013/0169466 gives example calculations for setting threshold values.

Still referring to FIG. 10 and continuing with process 1000, at block 1035 the algorithm a decision is made regarding the amplitude vs. the entry threshold. If the amplitude is less than or equal to the entry threshold control is passed to block 1037, wherein the entry status for this antenna is cleared and the timeout counter for this antenna is stopped. Then control is passed to the start of the loop at block 1010 again. On the other hand, if at block 1035 the amplitude is greater than the entry threshold, then control is passed to block 1038 of the algorithm. At block 1038 the algorithm checks if the phase is decreasing, indicating the object is moving toward the antenna.

The phase slope can be calculated using a least squares formula from a set of N unwrapped phase samples, $\phi_{RX}(n)$, taken at times t(n), where without loss of generality, n=0 through N−1 are taken. The slope of the phase over these N samples is:

$$\theta_{slope} = \frac{\overline{t(n) \cdot \varphi_{RX}(n)} - \overline{t(n)} \cdot \overline{\varphi_{RX}(n)}}{\overline{t(n)^2} - (\overline{t(n)})^2},$$

where the samples average is defined as $$\overline{x(n)} = \frac{1}{N} \sum_{n=1}^{N} x(n).$$

If the phase is not decreasing, control is passed to block 1037 wherein the entry conditions are cleared and the loop begins again. However, if the phase is decreasing at block 1038, then control is passed to block 1040. At block 1040 the algorithm checks if the entry condition was already set for this antenna on a prior execution of the loop. If so, the control is passed to block 1042 where the timeout condition is checked. The timeout counter is used to confirm that the object entry happens within a realistic period of time. This is application dependent and depends on the slowest speed that would be expected in the environment. If a timeout has occurred at block 1042, then control is passed to clear the entry conditions at block 1037 and return control to the top of the loop. On the other hand, if a timeout has not occurred at block 1042, then control is passed to block 1050. Furthermore, if at block 1040 the entry condition had not previously been set, the control is passed to block 1045 where the entry status is initialized to true and the timeout counter is started.

Continuing with process 1000, at block 1050 the algorithm checks if there are at least M antennas in the entry state. The value of M will depend on how many antennas cover the interrogation zone and how sure the user wishes to be in the object detection. Typically increasing M will decrease the number of false alarms at the expense of a increased probability of missing an object. Conversely, decreasing M will improve the probability of detecting objects, but may also raise the probability of false alarming. If the condition check at block 1050 is affirmative, then control is passed to block 1055 where an object detection message is generated and sent to the client computer network. The entry status for all antennas is also cleared in order to minimize the number of redundant object detection messages. Control of the algorithm is then passed to the start of the loop at block 1010. If the condition at block 1050 is negative, then control of the algorithm is then passed to the start of the loop at block 1010.

With regard to the number of antennas used to cover an interrogation zone, in general multiple antennas is better than just one in order to improve spatial diversity. Furthermore, placing antennas on opposite sides of the interrogation zone helps discriminate objects which are simply moving past or near the interrogation zone from those actually coming into the interrogation zone. This is because an object coming into the interrogation zone will be approaching all the antennas, while an object moving past the interrogation zone can be moving toward some antennas, but away from others.

Figure 11:
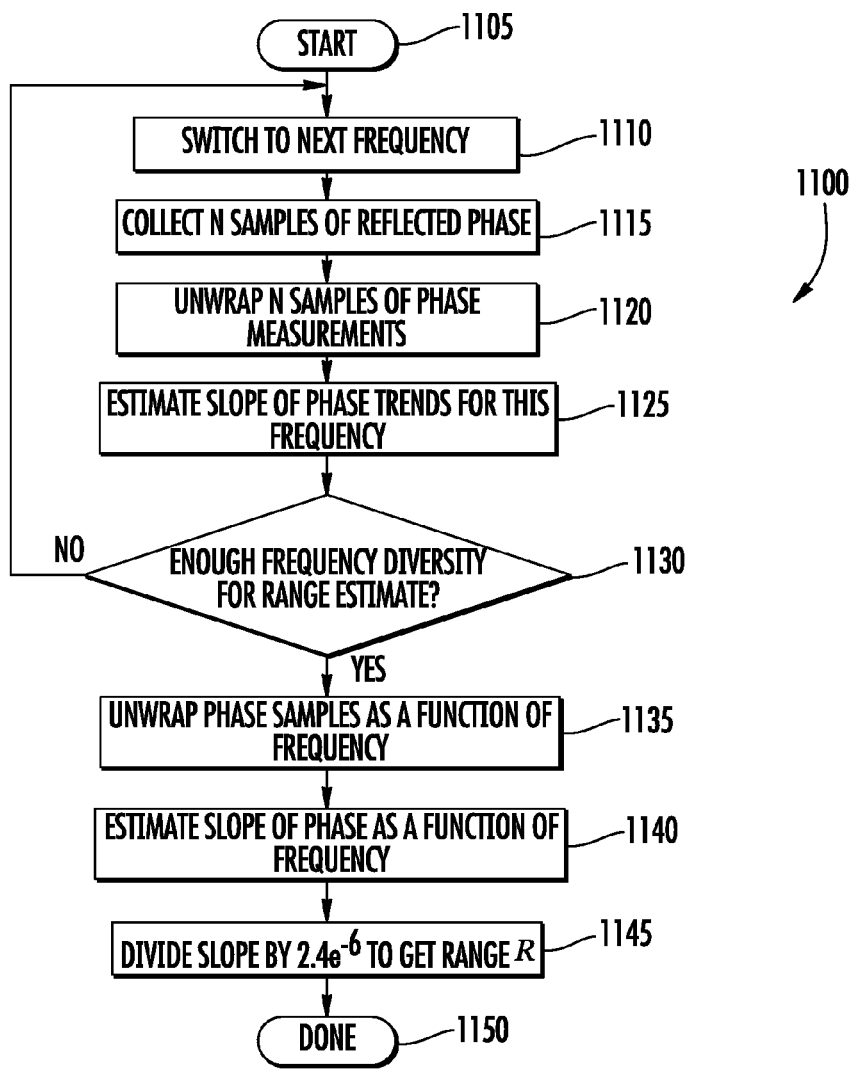
FIG. 11 shows a flowchart illustrating a process for estimating the range of an object from an antenna using a linear fit of the phase vs. frequency according to example embodiments of the invention.

FIG. 11 illustrates an algorithm to estimate the range of an object from an antenna. The entire process 1100 occurs on a single antenna. At block 1105 the algorithm enters the frequency hopping loop wherein data is gathered at multiple frequencies. At block 1110 the algorithm switches to the next frequency. At block 1115 the algorithm collects N samples of reflected RF phase signals. Optionally, at block 1120 the algorithm unwraps the N samples of phase measurements. At block 1125 the algorithm estimates the slope of the phase signals for this frequency. This may be used in the object detection algorithm to estimate motion. At block 1130 the algorithm checks to determine if enough frequencies have been sampled. If not, the algorithm returns control to the top of the loop at block 1110 where the next frequency is tuned to. However, if at block 1130 it is determined that enough frequencies have been sampled, then the algorithm proceeds to block 1135 where the phase samples are unwrapped as a function of frequency. In this block the collection of phase samples for each frequency may be averaged together to produce a single phase sample per frequency, or the last phase sample from each frequency could be used, or all samples could be used in a linear regression fashion. At block 1140 the algorithm estimates the slope of the phase vs. frequency line. At block 1145 the algorithm scales the slope of this straight line fit to estimate the range R. The algorithm is then done for the current antenna.

Figure 12:
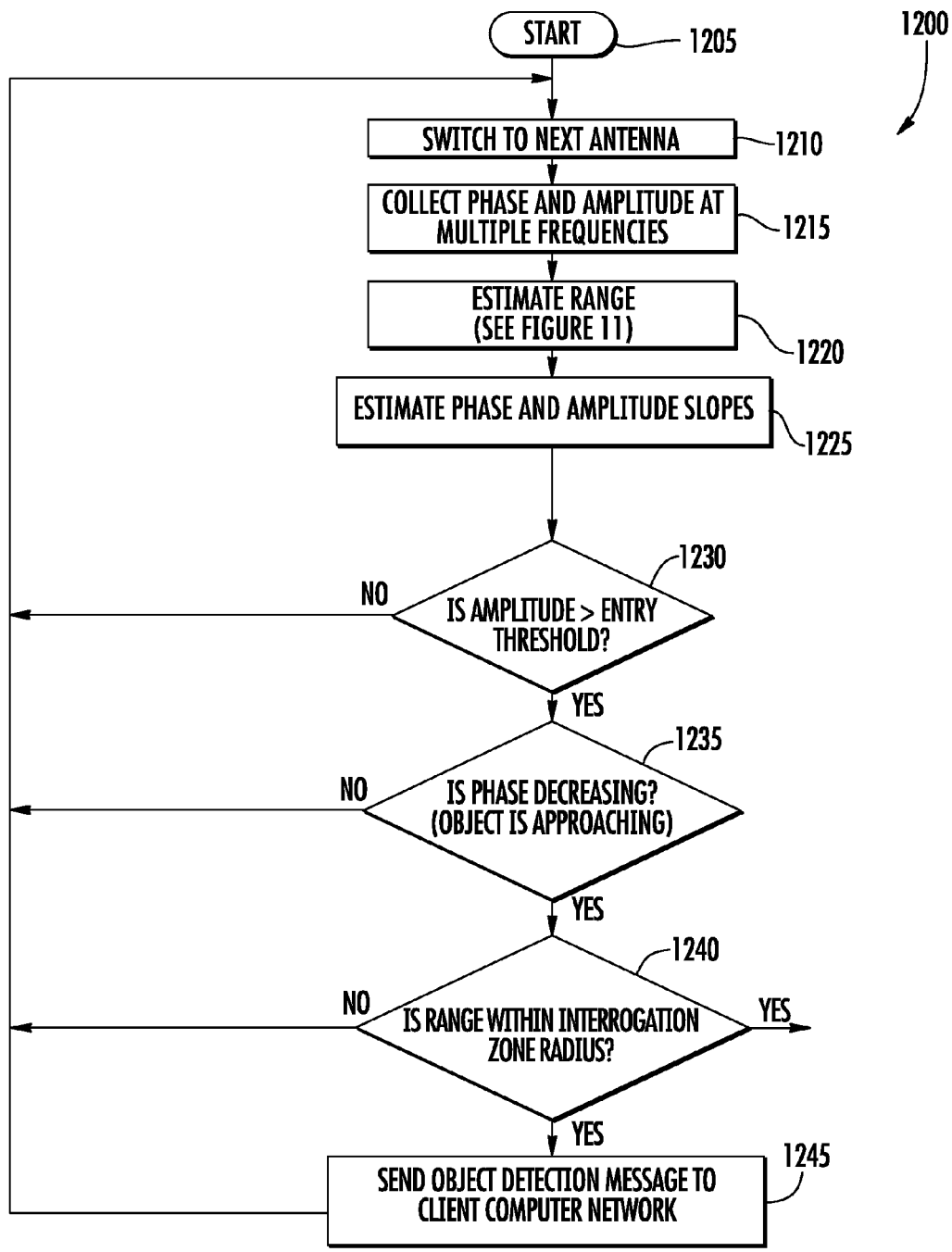
FIG. 12 shows a flowchart illustrating a process for detecting the entry of an object into the interrogation zone using range estimates from one or more antennas according to example embodiments of the invention.

FIG. 12 illustrates an algorithm to detect the entrance of an object into the interrogation zone based on the reflected carrier amplitude and/or phase estimates from one or more antennas when frequency hopping is used and range estimation is employed. In this embodiment the motion of the object must be slow enough so that the object does not move substantially between the multiple frequencies measurements. Radio architectures based on direct digital synthesis (DDS) are advantageous in this respect, since the time to switch from one frequency to another is virtually instantaneous. The emerging technology of RF DACs, which includes DACs fast enough to directly produce the RF signal in a conventional way or those which has an internal digital mixing process to generate the output signal in a higher Nyquist band, is very promising for DDS at UHF and microwave frequencies.

Referring to FIG. 12, process 1200, at block 1205 the algorithm starts into the main object detection loop. At block 1210 the algorithm switches to the next antenna in the sequence, if there are multiple antennas in use covering the interrogation zone. At block 1215 the algorithm collects phase and/or amplitude data on multiple frequencies. At block 1220 the algorithm estimates the range R for the current antenna. This is detailed as process 1100 in FIG. 11. At block 1225 the algorithm estimates the phase and/or amplitude slopes. At block 1230 the algorithm determines if the amplitude exceeds the entry threshold. If not, the algorithm loops back to the beginning of the object detection loop. Otherwise the algorithms proceeds to the next decision criteria in block 1235. At block 1235 the algorithm checks if the phase signal is decreasing. If not, the algorithm loops back to the beginning of the object detection loop. Otherwise the algorithms proceeds to the next decision criteria in block 1240. At block 1240 the algorithm checks if the range is within the interrogation zone radius. If not, the algorithm loops back to the beginning of the object detection loop. Otherwise the algorithms proceeds to the block 1245. At block 1245 the algorithm sends an object detection message to the client computer network.

Figure 13:
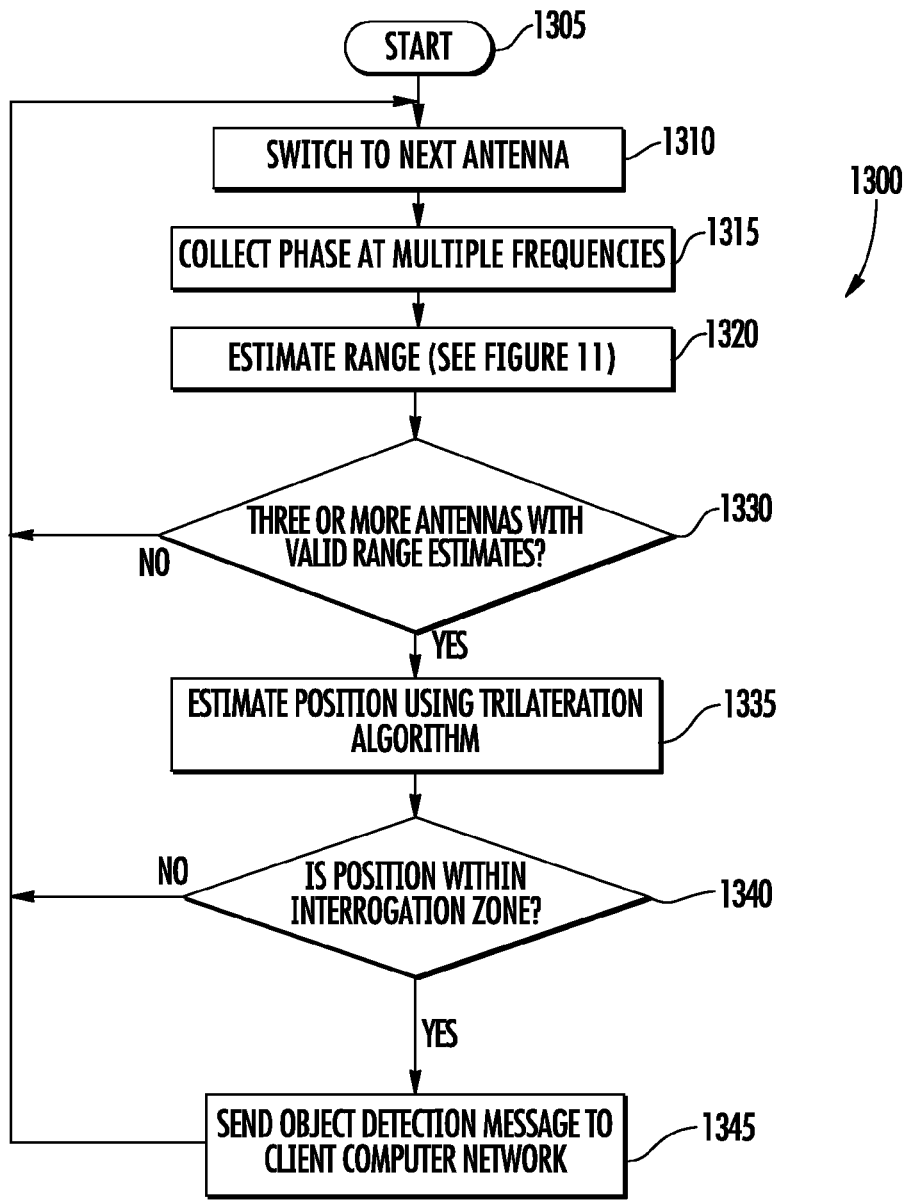
FIG. 13 shows a flowchart illustrating a process for detecting the entry of an object into the interrogation zone using range estimates from multiple antennas to estimate the position of an object using trilateration calculations according to example embodiments of the invention.

FIG. 13 illustrates an algorithm to detect the entrance of an object into the interrogation zone based on the reflected carrier phase estimates from multiple antennas when frequency hopping is used together with range estimation and trilateration between multiple antennas. In this embodiment the motion of the object must be slow enough so that the object does not move substantially between the multiple frequency measurements. Referring to process 1300, at block 1305 the algorithm starts into the main object detection loop. At block 1310 the algorithm switches to the next antenna in the sequence. At block 1315 the algorithm collects phase data on multiple frequencies. At block 1320 the algorithm estimates the range R for the current antenna. This is detailed as process 1100 in FIG. 11. At block 1330 the algorithm determines if three or more antennas have valid range estimates. If not, the algorithm loops back to the beginning of the object detection loop. Otherwise the algorithms proceeds to the block 1335. At block 1335 the algorithm estimates the object position using a trilateration algorithm. At block 1340 the algorithm checks if the position is within the interrogation zone. If not, the algorithm loops back to the beginning of the object detection loop. Otherwise the algorithms proceeds to the block 1345. At block 1345 the algorithm sends an object detection message to the client computer network.

Note that other RF object detector algorithms can be used, such as neural networks, fuzzy inference systems, Bayesian decision theory, etc. These alternatives do not depart from the invention for which embodiments are disclosed herein. With any of these methods, decision statistics can be based on reflections of RF signals from objects. Likewise, range and position estimates can be made using other or additional techniques such as synthetic apertures, but these are still based on phase measurements of the reflected RF signal, and so the techniques do not depart from the spirit and scope of the invention claimed herein.

It cannot be overemphasized that the description above of a combined RF object detector and RFID system is just one example of how the RF object detector of embodiments of the invention can be included in a system with multiple functions. As other examples, the RF object detector can be used in a EAS systems, RFID portal systems, conveyor systems, a robotic system or any other system used in manufacturing or distribution. In such systems, space may be at a premium, therefore, a single antenna may be used in a mono-static configuration. However, the RF object detector according to any of the embodiments described herein could be adapted to such systems if desired. An RF object detector according to embodiments of the invention can also be included in various types of security systems, including those using biometric or other algorithmic identification techniques.

The processor used to implement an embodiment of the invention may be a general purpose digital signal processor, such as those commercially available from Texas Instruments, Inc., Analog Devices, Inc., or Freescale Semiconductor, Inc. It could as well be a field programmable gate array (FPGA) as are available from Xilinx, Inc., Altera Corporation, or other vendors. The processor could also be a fully custom gate array or application specific integrated circuit (ASIC). Any combination of such processing elements may also be referred to herein as a processor or DSP. One example embodiment uses a Blackfin® programmable DSP available from Analog Devices, Inc., capable of 500 MHz operation with integrated dual multiply/accumulate processors for up to $10^9$ multiply/accumulate operations per second.

The object detection systems and methods described above use a "DC-coupled" approach, wherein the I and Q outputs of a receive mixer are DC coupled to an ADC. The DC coupling creates DC offsets in the baseband. Controlling DC offsets can require more expensive analog hardware for the filtering and amplification in baseband and in the analog-to-digital converter. An alternative embodiment is to AC couple the baseband. One approach to an AC coupled design is described in the previously referenced US Patent Application Publication 2013/0169466. This technique used a modulated signal in the transmit waveform to detect reflected carrier level in the receiver. This creates extra complexity in the transmitter and adds extra signal modulation over the air interface, which is undesirable. Another approach to an AC coupled receiver is given in PCT Patent Application PCT/US2012/038587, having an international filing date of May 17, 2012, which is incorporated herein by reference.

The example devices and methods in this disclosure can achieve ranges of 5 meters or more with reasonably sized antennas, for example 30 cm in diameter. The example RF object detection devices and methods can be integrated into other ISM band devices such as RFID readers or IEEE 802.11 & 802.15 devices. In some embodiments, a general purpose processor such as a DSP, microcontroller or microprocessor is used and firmware, software, or microcode can be stored in a tangible medium that is associated with the device. Such a medium may be a memory integrated into the processor, or may be a memory chip that is addressed by the controller to perform control functions. Such firmware, software or microcode is executable by the processor and when executed, causes the controller to perform its control functions. Such firmware or software could also be stored in or on a tangible medium such as an optical disk or traditional removable or fixed magnetic medium such as a disk drive used to load the firmware or software into an RF object detector system.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A system comprising:
a receiver to receive a returned RF signal including a carrier signal reflected from an object;
a transmitter to transmit an incident radio frequency (RF) signal modulated with radio frequency identification (RFID) commands; and
a processor connected to the transmitter and the receiver to extract modulated RFID responses from the returned RF signal to detect an RFID tag and to detect objects by measuring at least one of a phase and an amplitude of the carrier signal in the returned RF signal.

2. The system of claim 1 further comprising a digital-to-analog converter connected to the processor to modulate the incident RF signal with the RFID commands.

3. The system of claim 1 further comprising an antenna connected to the transmitter and the receiver.

4. The system of claim 3 wherein the antenna further comprises a plurality of antennas.

5. The system of claim 4 wherein the processor uses the plurality of antennas when arranged on different sides of an interrogation zone to discriminate between objects in the interrogation zone and objects outside the interrogation zone.

6. The system of claim 4 wherein some of the antennas are connected to the receiver and other of the antennas are connected to the transmitter.

7. The system of claim 3 wherein the processor discriminates between moving objects and stationary objects using at least one of phase measurements and amplitude measurements over time.

8. The system of claim 7 wherein the processor makes the at least one of phase measurements and amplitude measurements during an RFID receive slot.

9. The system of claim 4 further comprising a coupler disposed between the plurality of antennas and the transmitter and the receiver to enable the plurality of antennas to be used for both sending the incident RF signal and receiving the returned RF signal.

* * * * *